US011281364B2

(12) United States Patent
Chin

(10) Patent No.: US 11,281,364 B2
(45) Date of Patent: Mar. 22, 2022

(54) FLOWCHART-STYLE DIAGRAMMING TOOL TO BUILD AUTOMATED WORKFLOWS

(71) Applicant: Citrix Systems, Inc., Fort Lauderdale, FL (US)

(72) Inventor: Michelle Toyo Chin, Raleigh, NC (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 65 days.

(21) Appl. No.: 16/227,134

(22) Filed: Dec. 20, 2018

(65) Prior Publication Data

US 2020/0201525 A1 Jun. 25, 2020

(51) Int. Cl.
| | |
|---|---|
| *G06F 3/0484* | (2013.01) |
| *G06F 3/0482* | (2013.01) |
| *G06Q 10/06* | (2012.01) |
| *G06F 3/04847* | (2022.01) |

(52) U.S. Cl.
CPC ........ *G06F 3/04847* (2013.01); *G06F 3/0482* (2013.01); *G06Q 10/0633* (2013.01)

(58) Field of Classification Search
CPC .. G06Q 10/06; G06Q 10/0633; G06Q 10/103; G06F 8/34; G06F 3/0482; G06F 9/451; G06F 3/04842
See application file for complete search history.

(56) References Cited

U.S. PATENT DOCUMENTS

| | | | |
|---|---|---|---|
| 10,282,689 B1 | 5/2019 | Johnston et al. | |
| 2006/0005140 A1* | 1/2006 | Crew | G06Q 10/06316 715/760 |
| 2006/0069596 A1* | 3/2006 | Hatoun | G06Q 20/108 705/70 |
| 2007/0236708 A1* | 10/2007 | Jahn | G06Q 10/06 358/1.6 |
| 2011/0307818 A1* | 12/2011 | Eby | G06Q 10/103 715/769 |
| 2014/0350997 A1* | 11/2014 | Holm | G06Q 50/01 705/7.26 |
| 2016/0103706 A1* | 4/2016 | Novaes | G06Q 10/10 718/102 |
| 2017/0316363 A1* | 11/2017 | Siciliano | G06Q 10/10 |
| 2018/0107461 A1* | 4/2018 | Balasubramanian | G06F 8/34 |
| 2018/0165066 A1* | 6/2018 | Sinha | G06F 9/45558 |
| 2018/0165124 A1* | 6/2018 | Sinha | G06F 8/24 |
| 2020/0151630 A1* | 5/2020 | Shakhnovich | G06F 40/174 |

* cited by examiner

*Primary Examiner* — Sang H Kim

(74) *Attorney, Agent, or Firm* — Foley & Lardner LLP

(57) ABSTRACT

Systems and methods described herein provide an automated workflow tool that automatically and efficiently creates an executable workflow while preventing or reducing the introduction of errors into the workflow. The tool receives a selection of a start tile. In response, the tool presents a number of selectable items to configure an action to detect that initiates execution of the start tile as the first step in the workflow. Responsive to saving a configuration of the start tile including the action, the tool determines that the configuration of the start tile instructs the tool to add a second tile connected to the start tile on the canvas of the workflow. The tool presents a number of selectable items to configure the second tile as a next step in the workflow. The tool executes the workflow configured with the start tile and the second tile responsive to detecting the action configured in the start tile.

20 Claims, 8 Drawing Sheets

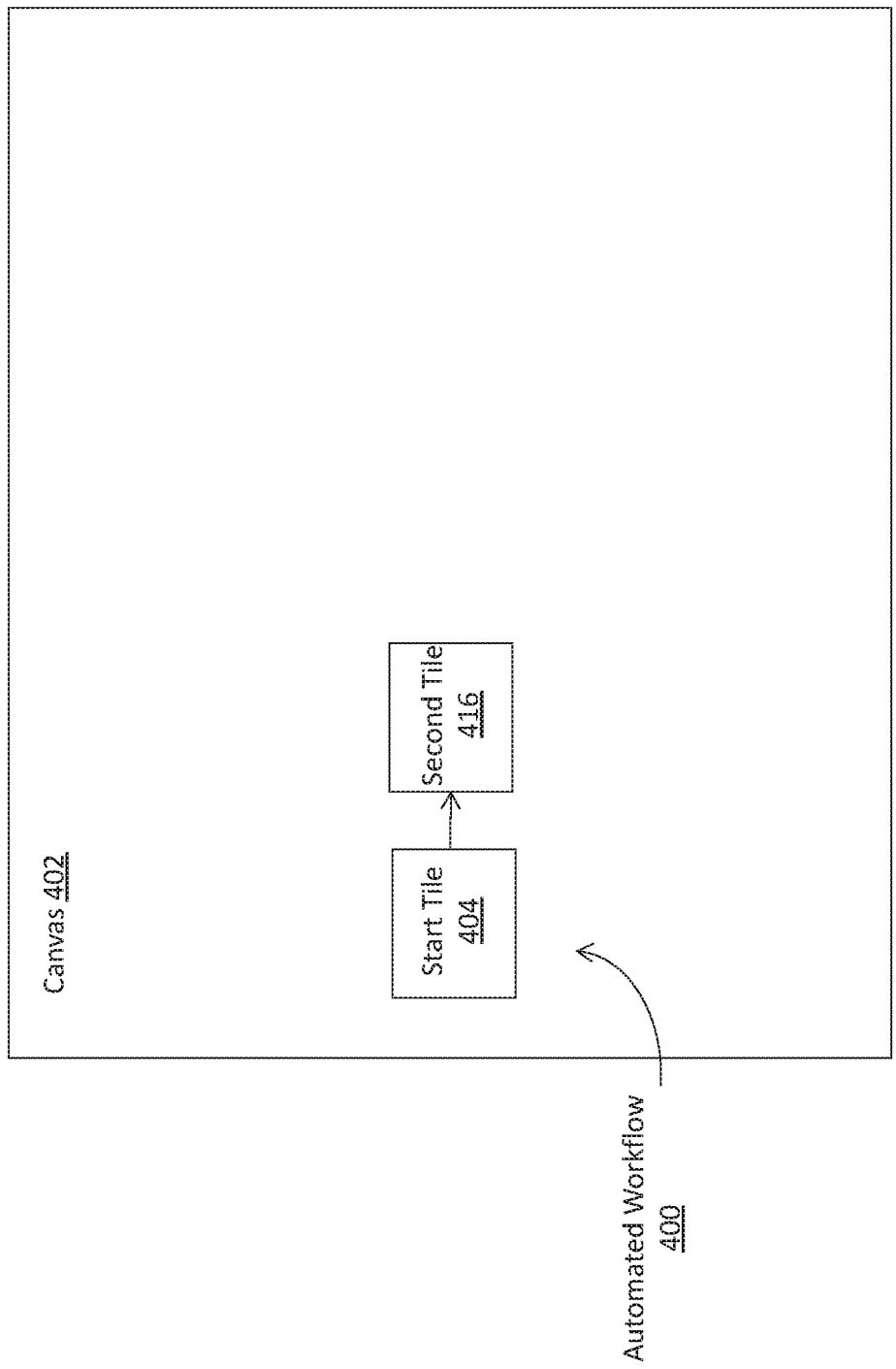

FLOWCHART-STYLE DIAGRAMMING TOOL TO BUILD AUTOMATED WORKFLOWS

FIELD OF THE DISCLOSURE

The present application generally relates to automatically creating an executable workflow.

BACKGROUND

Computing devices or systems can execute a workflow to perform one or more processing tasks. However, due to the increasing complexity of such workflows, technical challenges arise in efficiently creating a workflow for execution by a computing device or system without errors or bugs that can cause or result in execution failure, erroneous results, or increased processor, memory, or bandwidth utilization.

BRIEF SUMMARY

The present disclosure is directed towards systems and methods for automatically creating an executable workflow. The present technical solution provides an automated workflow tool that can automatically and efficiently create a workflow for execution by a computing device or system. The tool of the present technical solution can efficiently create a complex workflow comprising policies, logic statements, rules, or conditions while reducing or eliminating errors or bugs from the workflow prior to execution, thereby preventing or minimizing execution failure, erroneous traversing of workflow paths, while reducing processor, memory, or bandwidth utilization.

For example, the present technical solution can convert processes (e.g., onboarding a client) into one or more automatically created workflows. The present technical solution can simultaneously build an automated version of the workflow based on one or more inputs provided via a user interface. The tool can establish processing logic at each step in the workflow and proactively provide an element and/or logic for the next step. Thus, the automated workflow can efficiently streamline a process while reducing execution failure or errors.

At least one aspect of the present technical solution is directed to a method for automatically creating an executable workflow. The method may include receiving a selection of a start tile by an automated workflow tool. The start tile may be previously placed by the automated workflow tool on a canvas of the automated workflow tool upon a request to create a workflow. Responsive to receiving the selection, the method may include opening, by the automated workflow tool, the start tile to present a first user interface of selectable items to configure an action to detect that initiates execution of the start tile as the first step in the automated workflow. Responsive to saving a configuration of the start tile including the action, the method may include determining, by the automated workflow tool, that the configuration of the start tile comprises a selection of a user interface element that instructs the automated workflow tool to add another step. Responsive to determining that the configuration of the start tile comprises the selection of the user interface element to instruct the automated workflow tool to add another step, the method may include creating, by the automated workflow tool, a second tile connected to the start tile on the canvas of the automated workflow. The second tile opens, upon selection, to present a second user interface of selectable items to configure the second tile as a next step in the automated workflow to execute based on one or more selections in the configuration of the start tile. The method may include executing, by the automated workflow tool, the automated workflow configured with at least the start tile and the second tile responsive to the automated workflow tool detecting the action configured in the start tile.

In some embodiments, creating the second tile may further include identifying, by the automated workflow tool responsive to saving a configuration of the second tile, that the configuration of the second tile comprises a second selection of a second user interface element that instructs the automated workflow to obtain an input element for the second step. Further, creating the second tile can include creating, by the automated workflow tool responsive to identifying the instruction to obtain an input element for the second step, a plurality of tiles to create two paths of execution of the automated workflow. The plurality of tiles include a decision tile connected to the second tile configured to detect receipt of the input element for the second step and select, based on the detection, one of the two paths of the automated workflow for execution.

In some embodiments, the configuration of the start tile may include selection via the first user interface of an item on which the automated workflow performs the action. The item includes one of the following: a contact, a file, a folder or a report. The action may include one of creating, changing or deleting an item. The automated work flow tool can interface with one or more systems to detect the action of the start tile.

The configuration of the second tile may include selection via the second user interface of a second action to be performed upon completion of execution of the start tile. The second user interface is configured to provide one or more selections based at least on an item of the action selected in the start tile, and the automated work flow tool interfaces with one or more systems to execute the second action of the second tile.

The method may further include providing access, by the automated workflow tool, to the configuration of the automated workflow to a plurality of users and providing a third user interface for any one or more of the plurality of users to add comments to the configuration of the automated workflow. Creating the second tile may further include performing error detection to flag one or more errors in the automated workflow, and resolving the one or more errors prior to executing the automated workflow.

At least one aspect of the present technical solution is directed to a system to automatically create an executable workflow. The system includes an automated workflow tool of a device including one or more processors and memory. The automated workflow tool can receive a selection of a start tile previously placed by the automated workflow tool on a canvas of the automated workflow tool upon a request to create a workflow. Responsive to receiving the selection, the automated workflow tool can open the start tile to present a first user interface of selectable items to configure an action to detect that initiates execution of the start tile as the first step in the automated workflow. Responsive to saving a configuration of the start tile including the action, the automated workflow tool can determine that the configuration of the start tile comprises a selection of a user interface element that instructs the automated workflow tool to add another step. Responsive to determining that the configuration of the start tile comprises the selection of the user interface element to instruct the automated workflow tool to add another step, the automated workflow tool can create a second tile connected to the start tile on the canvas of the automated workflow. Upon selection, the second tile can open to present a second user interface of selectable items to configure the second tile as a next step in the automated workflow to execute based on one or more selections in the configuration of the start tile. The automated workflow tool can execute the automated workflow configured with at least the start tile and the second tile responsive to the automated workflow tool detecting the action configured in the start tile.

In some embodiments, the automated workflow tool can further identify, responsive to saving a configuration of the second tile, that the configuration of the second tile includes a second selection of a second user interface element that instructs the automated workflow to obtain an input element for the second step. The automated workflow tool can further create, responsive to identifying the instruction to obtain an input element for the second step, a plurality of tiles to create two paths of execution of the automated workflow. The plurality of tiles include a decision tile connected to the second tile configured to detect receipt of the input element for the second step and select, based on the detection, one of the two paths of the automated workflow for execution.

The configuration of the start tile can include selection via the first user interface of an item on which the automated workflow performs the action, the item comprising one of the following: a contact, a file, a folder or a report. The action can include one of creating, changing or deleting an item. The automated work flow tool can further interface with one or more systems to detect the action of the start tile. The one or more systems can include an application configured to manage one of a contact, a file, a folder or a report. The automated work flow tool can further interface with one or more systems to populate selection of the first user interface or the second interface.

The configuration of the second tile can include selection via the second user interface of a second action to be performed upon completion of execution of the start tile. The second user interface is configured to provide one or more selections based at least on an item of the action selected in the start tile, and the automated work flow tool is configured to interface with one or more systems to execute the second action of the second tile.

The automated workflow tool can further provide access to the configuration of the automated workflow to a plurality of users and provide a third user interface for any one or more of the plurality of users to add comments to the configuration of the automated workflow.

In some embodiments, the automated workflow tool can further perform error detection to flag one or more errors in the automated workflow, and resolve the one or more errors prior to execution of the automated workflow.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIGS. 4A, 4B, 4C, 4D, and 4E illustrate schematic diagrams of an example automated workflow at various stages during creation of the automated workflow.

Figure 1:
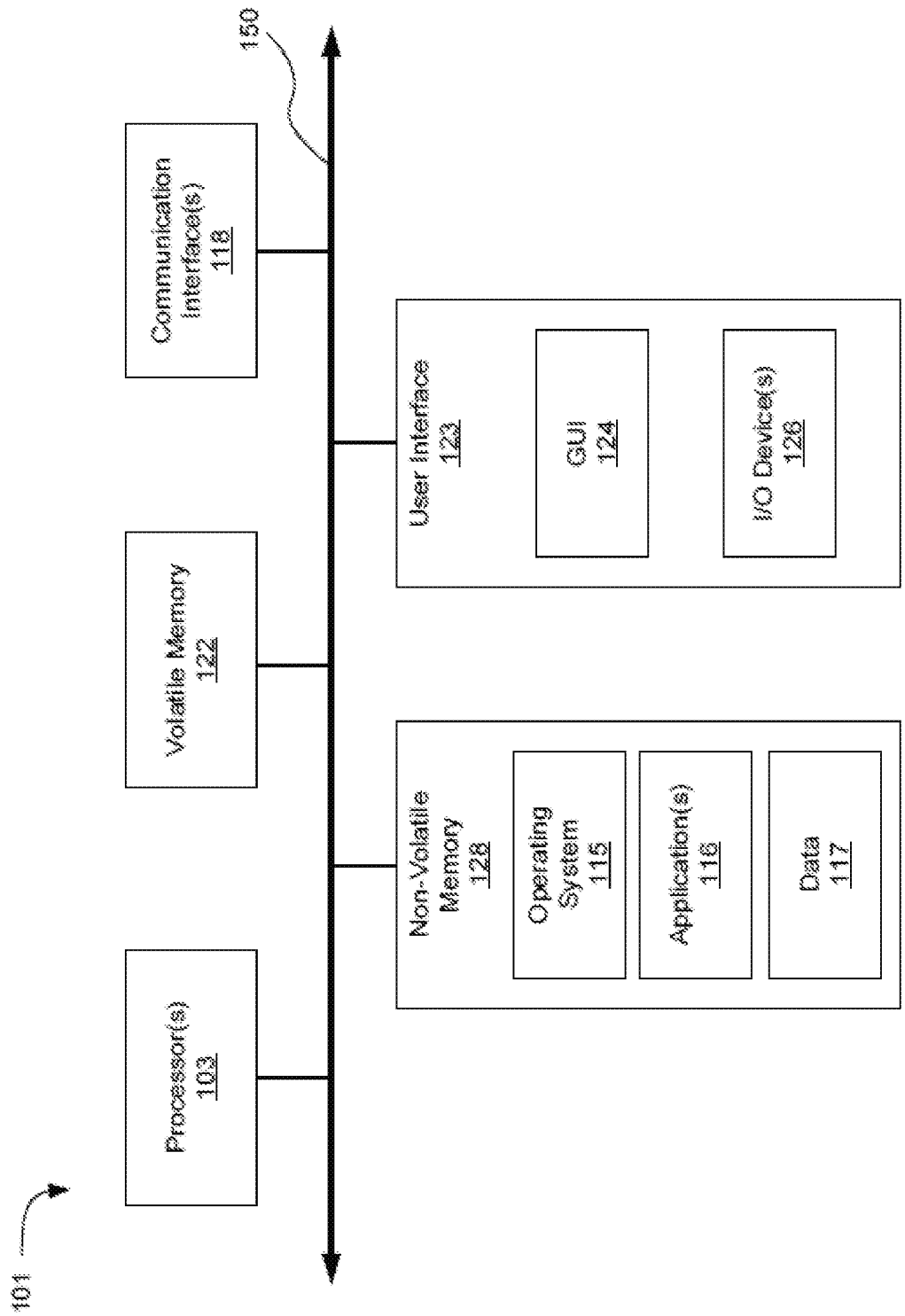
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for automatically creating an executable workflow.

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Automatically Creating an Executable Workflow

The present disclosure is directed towards systems and methods for automatically creating an executable workflow. The present technical solution provides an automated workflow tool that can automatically and efficiently create a workflow for execution by a computing device or system. The tool of the present technical solution can efficiently create a complex workflow comprising policies, logic statements, rules, or conditions while reducing or eliminating errors or bugs from the workflow prior to execution, thereby preventing or minimizing execution failure, erroneous traversing of workflow paths, while reducing processor, memory, or bandwidth utilization.

For example, the present technical solution can convert processes (e.g., onboarding a client) into one or more automatically created workflows. The present technical solution can simultaneously build an automated version of the workflow based on one or more inputs provided via a user interface. The tool can establish processing logic at each step in the workflow and proactively provide an element and/or logic for the next step. Thus, the automated workflow can efficiently streamline a process while reducing execution failure or errors.

The present technical solution can also allow users (e.g., who may not have any or have limited technical knowledge) to convert processes (e.g., onboarding a client) into one or more automatically created workflows. As such, the users can work more efficiently and focus on what is important. In some embodiments, while the users diagram their process (e.g., building a flowchart or workflow), the disclosed systems and methods can simultaneously build an automated version of the workflow based on one or more inputs provided by the users. In some embodiments, the disclosed systems and methods may be referred to as a "smart" tool that allows the users to focus on certain demanding decisions (e.g., who should sign the document?) by acknowledging the logic needed for each step of the workflow and proactively providing an element and/or logic for the next step. Thus, the users can use the automated workflow to streamline their process more efficiently.

Automated workflow techniques can improve productivity and efficiency of such decisions and/or or actions. However, when a computing device or system executes workflows that are inefficient or contain errors or bugs, the computing device can malfunction or traverse incorrect paths in the workflow, thereby resulting in excessive or wasted computer resource utilization (e.g., processor utilization, memory utilization, or bandwidth utilization). Thus, the present technical solution can provide technical improvements while solving technical challenges that can include, for example, improved user interfaces, reduce data file processing related to actions, and reliable coding of scripts.

The automated workflow tool of the present technical solution and improvement to technology can address some of the problems described herein by providing an automated workflow tool to automatically create an executable workflow. For example, the automated workflow tool can automatically process documents to successfully start building a workflow responsive to a visual diagram of their processes as a flowchart. The disclosed automated workflow tool can start building the automated workflow. As the users build the workflow, the users are instructed or informed to provide basic information (e.g., document signers) and the automated workflow can build out the logic underneath the workflow. The users are not required to understand the logic and/or corresponding coding techniques. Further, since the workflow can be complex and hard to articulate, the disclosed automated workflow tool allows for flexibility. For example, the automated workflow tool can detect errors or missing steps and automatically insert one or more steps into the workflow, flag one or more errors, or resolve the flagged or detected errors.

Figure 2:
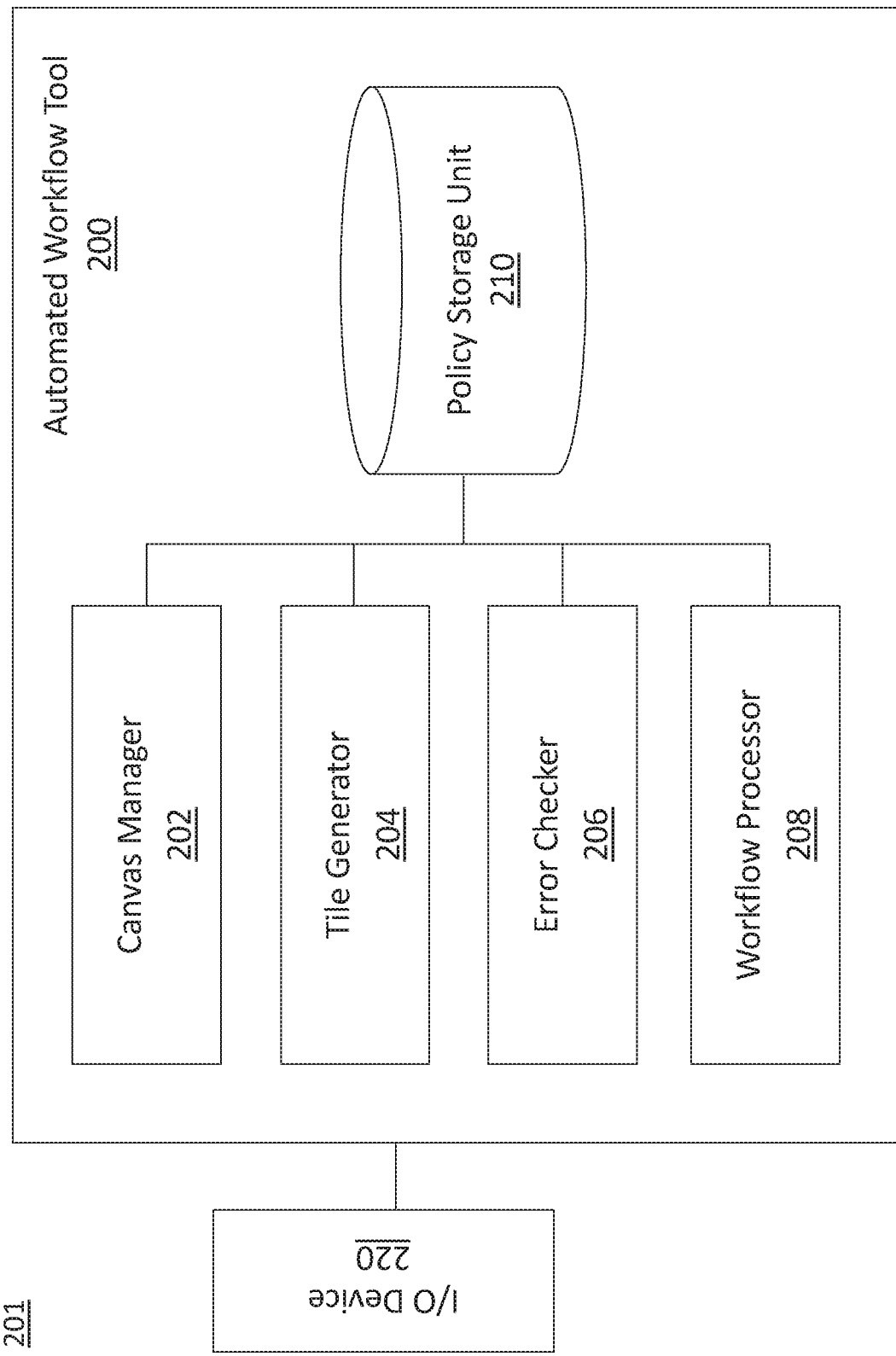
FIG. 2 is a block diagram of an example embodiment of a system to automatically create an executable workflow.

Referring now to FIG. 2, depicted is a block diagram of an example embodiment of a system to automatically create an executable workflow. The system 201 can include an automated workflow tool 200. The automated workflow tool 200 may be a part of the client application 404 discussed herein. Thus, automated workflow tool 200 may be accessible to a user through an embedded browser of the client application. In some embodiments, automated workflow tool 200 can include a canvas manager 202, a tile generator 204, an error checker 206, a workflow processor 208, and/or a policy storage unit 210. The automated workflow tool 200 may also include an input/output (I/O) device 220 coupled to or integrated into the automated workflow tool 200.

Each of the above-mentioned elements or entities can be implemented in hardware, software or a combination of hardware and software, in one or more embodiments. Each component of the automated workflow tool 200 may be implemented using hardware or a combination of hardware or software detailed above in connection with FIG. 1. For instance, each of the elements or entities shown in FIG. 2 can include any application, program, library, script, task, service, process or any type and form of executable instructions executing on hardware (e.g., of the client device). The hardware includes circuitry such as one or more processors in one or more embodiments.

The automated workflow tool 200 can include a canvas manager 202 designed, constructed, configured or operational to receive an indication to create a workflow. The canvas manager 202 of the automated workflow tool 200 can receive, detect, or otherwise obtain an indication of a selection of a start tile. The start tile may be previously placed by the automated workflow tool 200 on a canvas of the automated workflow tool upon a request to create an automated workflow. The canvas of the automated workflow tool can refer to, for example, a portion or pane of a graphical user interface (GUI) provided by the tool. The canvas can receive workflow input, and provide an output. The canvas can provide a graphical view of a workflow process, showing how process elements or actions are connected. For example, the canvas manager 202 can be hard-coded to place the start tile upon initialization of the canvas, launching of the canvas, or launching of the automated workflow tool 200. The canvas manager 202 can use a default configuration data file stored in a data repository (e.g., policy storage unit 210) that contains a default or initial configuration for the canvas that can include the start tile. The start tile can refer to, for example, a GUI element in the tool itself that provides a starting or initial point for the flow. The start tile can represent a button (e.g., an interactive GUI element) in the automated workflow with which the workflow user can interact to start the workflow. The start tile can be preset or preconfigured with selectable actions or items that are customized or tailored to initiate or begin the workflow. Thus, the start tile can include a GUI element with customized, interactive elements to start a workflow.

The automated workflow tool 200 can present a graphical user interface (GUI) via I/O device 220. A user may access the automated workflow tool through the GUI provided by the I/O device 220. The tool 200 (e.g., via canvas manager 202) can provide one or more buttons via the GUI. On the GUI, the user can make a request to create an automated workflow by clicking one or more buttons and/or moving an indicator (e.g., a finger or a mouse) into a certain filed. In response to detecting such a request, the canvas manager 202 can provide one or more options for a start tile on a canvas through the GUI. Each of the options of the start tile can be associated with one or more processing tasks, electronic workflows, data ingestion, or an electronic transaction. For example, the options of the start tile can facilitate digital processes related to hiring a new employee, signing a contract with a new client, proposing a modified contract with an existing client, etc., and the options may be provided based on one or more business transactions, human resource processes, or operations of the organization managed and recorded via the automated workflow tool 200. In some embodiments, such a record of the previous operations may be stored in the policy storage unit 210, and thus the canvas manager 202 can communicate with the policy storage unit 210 to obtain the record in response to receiving the request to create an automated workflow and to present the user the options of the start tile.

The canvas manager 202 can be configured to establish or initiate a digital canvas, such as the example canvas 402 depicted in FIGS. 4A-4E. The digital canvas can include or be configured with graphical user interface elements, logic, rules, policies, or other electronic actions or scripts that can automatically create a workflow. Responsive to a request to create a workflow, the canvas manager 202 can establish the digital canvas and automatically place a start tile on the digital canvas. The start tile can be placed on the digital canvas without receiving a separate request or indication to insert or place the start tile. For example, the canvas manager 202 can automatically place the start tile on the digital canvas based on a request or indication to create a workflow. The canvas manager 202 can be hard-coded or preconfigured to include the start tile as part of the initiation or establishing of the digital canvas.

In some cases, the canvas manager 202 can detect or determine that the digital canvas lacks any tiles, or that the start tile is absent from the digital canvas. Responsive to the detection or determination, the canvas manager 202 can automatically place, insert, or otherwise present a start tile on the digital canvas. For example, the canvas manager 202 can execute a monitoring script to monitor the digital canvas. The canvas manager 202 can periodically monitor the digital canvas, or invoke the monitoring script responsive to an event, condition or trigger associated with the digital canvas (e.g., the deletion of a tile or other element on the digital canvas). If the canvas manager 202 detects, based on the monitoring of the digital canvas, that the digital canvas lacks any tiles, lacks the start tile, determines the start tile is absent from the digital canvas, or determines that digital canvas is empty or void of any tiles or the smart tile, then the canvas manager 202 can automatically place, insert or otherwise present the start tile on the digital canvas. The start tile can include or be configured with scripts, logic, rules, user interface elements, items, or policies. The start tile can execute or cause execution of such scripts or elements responsive to an invocation, interaction, or request.

For example, the automated workflow tool 200 can include a tile generator 204 designed, constructed, configured or operational to open the start tile. The tile generator 204 of the automated workflow tool 200 can open, responsive to receiving the selection, the start tile to present a user interface of selectable items to configure an action to detect that initiates execution of the start tile as the first step in the automated workflow. In some embodiments, in response to the user selecting at least one of the options of the start tile, the tile generator 204 can present (e.g., populate) one or more selectable items to the user through the user interface of the GUI. Such selectable items may allow the user to configure the start tile. For example, the start tile may be configured as a first step of the automated workflow. In some embodiments, the tile generator 204 may interface with one or more systems through the I/O device 220, for example, to populate the one or more selectable items through the user interface. For example, such systems may store or otherwise manage a number of selectable items (e.g., contacts, files, folder, and/or reports), which shall be discussed as follows.

The tile generator 204 can detect, monitor, or otherwise manage the user's action that configures the start tile. For example, the tile generator 204 may detect whether the user has acted to initiate execution of the start tile as the first step of the automated workflow. The tile generator 204 may recognize, identify, or otherwise determine the user's action, performed through the GUI, as an initiation to execute the start tile as the first step of the automated workflow by detecting at least one of the following: an action of creating a contact, a file, a folder, and/or a report; an action of changing a contact, a file, a folder, and/or a report; and an action of deleting a contact, a file, a folder, and/or a report. The tile generator 204 may interface with one or more systems through the I/O device 220, for example, to perform the above-mentioned detection operation. For example, such systems may include an application for storing or otherwise managing a respective number of contacts, files, folders, and/or reports. The user may access the systems to directly create, change, or delete at least one of the contacts, files, folder, and/or reports. The tile generator 204 may be notified by the systems that the user has performed at least one of the actions. Accordingly, the tile generator 204 can determine that the user has initiated execution of the start tile as the first step of the automated workflow.

For example, when a user wants to engage an existing contact as a client, the user may select a start tile from a number of options that are associated with such a certain business purpose (e.g., new client engagement). Upon the user selecting the start tile, which may be detected by the canvas manager 202, the tile generator 204 can populate a user interface to provide a number of selectable items for the user to configure the start tile. The tile generator 204 may present the selectable items as a series of related questions such as, for example, "when a contact, a file, a folder, or a record is created, changed, or deleted to become a client, to check conflict of interest, or to become a vendor?" In the current example, the user may select the items of "contact," "changed," and "become a client" to configure the start tile.

The tile generator 204 can detect completion of a configuration of the start tile. The tile generator 204 can detect completion based on receiving a satisfactory number of selections, input values, or instructions. The tile generator 204 can execute or run a tile completion detection technique, process or script to determine whether the configuration of the start tile is complete based on the received selections, input values, or instructions. For example, the tile generator 204, via the tile completion detection technique, can process, parse, or otherwise identify the selections, input values or instructions received via the GUI, and compare the received instructions with a template to determine whether the instructions are sufficient to execute the tile or perform a next step in the workflow. For example, if there are four input fields, and three of the input fields are marked as necessary or required, the tile generator 204 can determine whether satisfactory input values were provided for all three of the required input fields. In another example, if there is one required selection, the tile generator 204 can determine whether the required selection was made or received. The tile generator 204, responsive to determining that satisfactory selections, input or other instructions were received, can store the tile configuration.

The tile generator 204 can provide various types of tiles such as, for example, a start tile, a decision tile, an input tile, an output tile, etc. Each of these various types of tiles can include one or more necessary or required fields to be filled out. The tile generator 204 can employ at least one of the above-described tile completion detection techniques to detect or determine whether a configuration of each of the tiles is completed. As shall be discussed below, upon detecting that the configuration of at least the start tile is completed, the automated workflow tool 200 can automatically execute the workflow with the start tile as the first step.

After the tile generator 204 has detected the action of configuring the start tile, the user may, or be directed to, save the configuration through the user interface. Responsive to detecting that the configuration of the start tile is saved, the tile generator 204 can determine whether the configuration of the start tile includes a selection of a user interface element that instructs the automated workflow tool to add another step. For example, the tile generator 204 may use a policy to compare a value associated with the configuration of the start tile with a predetermined value that indicates or maps to an instruction to add another step. The user interface element may be displayed, as a clickable button or selectable block (e.g., a button/block associated with context of "add another step"), on a user interface identical to or different from the user interface that includes the selectable items to configure the start tile.

Responsive to the tile generator 204 determining that the configuration of the start tile includes the selection of the user interface element to instruct the automated workflow tool to add another step, the tile generator 204 can create a second tile connected to the start tile on the canvas of the automated workflow. In some embodiments, prior to creating the second tile to connect to the start tile, the tile generator 204 can present one or more options for the second tile. The one or more options of the second tile may be provided based on the one or more business transactions, human resource processes, or otherwise operations of the organization that the automated workflow tool previously handled and recorded (e.g., operations or actions configured for the start tile). In some embodiments, such a record of the previous operations may be stored in the policy storage unit, and thus the tile generator may communicate with the policy storage unit to obtain the record so as to present the user the options of the second tile.

Upon selecting the second tile, the tile generator 204 can open the second tile to present a user interface of selectable items to the user to configure the second tile as a next step (e.g., the second step) in the automated workflow. The configuration of the second tile includes selection via the user interface of an action to be performed upon completion of execution of the start tile. The user interface can provide one or more selections based at least on an item of the action selected in the start tile. The tile generator 204 can interface with one or more systems to populate the one or more selections of the user interface and/or to execute the action of the second tile.

Continuing with the above example, concurrently with or subsequently to the automated workflow tool executing the start tile to change a contact to become a client, the tile generator 204 may present a number of selectable items (e.g., actions) to the user to configure the second tile. The selectable items presented on the user interface may include the following: "create a folder," "send a document," "send an email," and "give folder access." The tile generator 204 may receive a selection of at least one of the items from the user, or the tile generator 204 may provide the user with one or more other user interface elements (e.g., "advanced option") on the user interface to alternatively or additionally configure the second tile.

Responsive to saving the configuration of the second tile, the tile generator 204 can further identify that the configuration of the second tile comprises a selection of a user interface element that instructs the automated workflow to obtain an input element for the second step. For example, the tile generator 204 can execute or run a tile configuration detection technique, process or script to determine whether the configuration of the second tile contains any selections, input values, or instructions to obtain an input element. In response to the tile generator 204 identifying the instruction to obtain an input element for the second step, the tile generator 204 can create a number of tiles so as to create corresponding number of paths to execute the automated workflow. In some embodiments, the number of tiles may include a decision tile connected to the second tile. The tile generator 204 may use the decision tile to detect whether the input element for the second step is received and based on the detection, select at least one the number of paths to execute the automated workflow.

The automated workflow tool 200 can include an error checker 206 designed, constructed, configured or operational to detect, flag or resolve errors, malfunctions, bugs, or missing input in order to reduce, minimize or prevent execution malfunctions of the workflow or excessive processor, memory or network bandwidth utilization. By detecting, flagging or resolving the potential error prior to saving and execution of the workflow, the error checker 206 can avoid or prevent wasted computing resource utilization by avoiding a malfunction of the workflow, or improve the reliability of the tasks performed via the workflow by avoiding the performance of erroneous tasks or the erroneous traversal of workflow paths.

The error checker 206 of the automated workflow tool 200 can perform one or more error detection operations to identify (e.g., flag) one or more errors in the automated workflow, and resolve the one or more identified errors prior to executing the automated workflow. In some embodiments, the error checker 206 may dynamically analyze and monitor each action configured by the user during the creation of the automated workflow, e.g., prior to the execution of any tile of the automated workflow, simultaneously with the execution of one or more certain tiles of the automated workflow, and/or subsequently to the execution of one or more certain tiles of the automated workflow. The error checker 206 may detect the presence of an error according to determining one or more criterion have not been met. Such criterion may be defined according to one or more policies and/or rules of the organization, and stored in the policy storage unit 210.

For example, the error checker 206 may track, monitor, or otherwise identify a number of input values configured for each of the tiles, a format of the input values configured for each of the tiles, and/or a number of selections configured for each of the tiles, and compare the identified values/numbers with one or more values/numbers defined in the one or more policies and/or rules of the organization to determine whether an error occurs. In another example, the error checker 206 may determine whether the identified values/numbers are compatible with one another according to the one or more policies and/or rules of the organization to determine whether an error occurs. The error checker 206 can be configured with a predetermined format or template with which the input values can be compared in order to determine compatibility. In some cases, the error checker 206 can determine compatibility based on evaluating the input value itself. For example, a certain input value may correspond to a feature or function that is not available in a current version of the executable workflow, in which case the error checker 206 can determine that the current version of the workflow does not support the input value or function, and either automatically adjust or modify the input value such that the input value is compatible, or provide an alert or notification to the user to adjust or modify the input value.

Upon the error checker 206 identifying the error(s), the error checker can automatically resolve the error(s) to conform the automated workflow to the policies and/or rules of the organization before initiating or continuing execution of the automated workflow. In some alternative or additional embodiments, the error checker 206 may notify the user of such identified error(s), which allows the user to resolve the error(s) before initiating or continuing execution of the automated workflow.

The automated workflow tool 200 can provide access to the configuration of the automated workflow to a number of users and provide a user interface for any one or more of the number of users to review the configuration of the automated workflow (e.g., add comments to the configuration of the automated workflow). Additionally or alternatively, the automated workflow tool 200 can provide a user interface for one or more authenticated users to edit the configuration of the automated workflow to a certain extent. The created workflow can be converted to an executable program or script. The created workflow can include or interface with a hooking component that is configured to intercept input data packets and determine whether an input data packet corresponds to a condition or event that triggers execution of the workflow. The created workflow can be converted to a software program such as an agent that executes on a client device to detect input corresponding to the workflow, or an indication to execute or initiate the workflow. The created workflow can reside on a server and communicate with an agent on a client device. The created workflow can be executed automatically (e.g., responsive to detecting a start condition or input), or execute responsive to a request to execute the workflow.

The automated workflow tool 200 can include a workflow processor 208 designed, constructed, configured or operational to execute the workflow created by the automated workflow tool 200. The workflow processor 208 of the automated workflow tool 200 can execute the automated workflow configured with at least the start tile and the second tile. In some embodiments, the workflow processor can initiate the execution of the automated workflow in response to the automated workflow tool (e.g., the tile generator) detecting the action configured in the start tile. Additionally or alternatively, the workflow processor may initiate the execution of the automated workflow in response to detecting the respective actions of the start tile and at least one connected tile (e.g., the above-discussed second tile).

Figure 3:
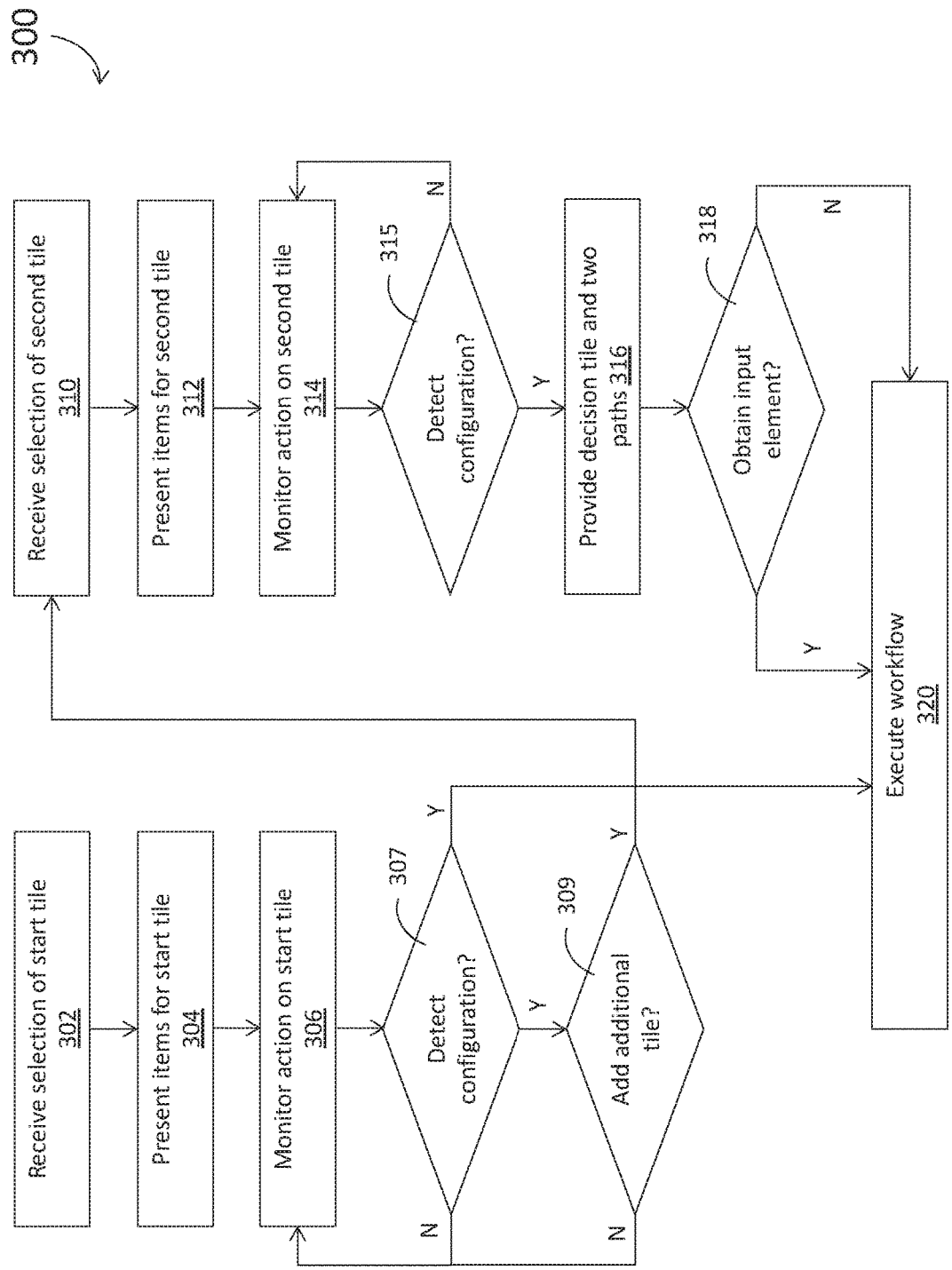
FIG. 3 is an example flow chart of a method for automatically creating an executable workflow.

Referring to FIG. 3, depicted is a flow diagram of a method 300 for automatically creating an executable workflow, in accordance with an embodiment. The functionalities of the method 300 may be implemented using, or performed by, the components described herein in connection with FIGS. 1-2. For example, the method 300 can be performed by an automated workflow tool, canvas manager, tile generator, error checker or workflow processor. The illustrated embodiment of the method 300 is merely an example. Therefore, it should be understood that any of a variety of operations may be omitted, re-sequenced, and/or added while remaining within the scope of the present disclosure.

In brief overview, a canvas manager of an automated workflow tool may receive a selection of a start tile at operation 302. Next, at operation 304, a tile generator of the automated workflow tool can present items for the start tile. At operation 306, the tile generator can monitor an action performed on the start tile. If an action to configure the start tile is detected at operation 307, the tile generator may further determine whether to add additional tile at operation 309, or a workflow processor of the automated workflow tool may execute the workflow. If no action to configure the start tile is detected and/or no additional tile is determined to be added, the tile generator may continue monitoring the action on the start tile. However, if an additional tile is determined to be added, the tile generator may receive a selection of a second tile at operation 310. Next, at operation 312, the tile generator may present items for the second tile. The tile generator can monitor an action performed on the second tile at operation 314. If an action to configure the second tile is detected at operation 315, the tile generator may provide a decision tile and two corresponding paths at operation 316; and if no action is detected at operation 315, the tile generator may continue monitoring the action on second tile. At operation 318, the tile generator may determine whether an input element is obtained. Based on the receipt of the input element, the tile generator may select one of the two paths to cause the workflow processor to execute the workflow at operation 320.

Referring still to FIG. 3, and in further detail, the canvas manager (e.g., 202) may receive a selection of a start tile at operation 302. The start tile may be previously placed by the automated workflow tool (e.g., 200) on a canvas of the automated workflow tool upon a request to create an automated workflow. In some embodiments, in response to detecting such a request, the canvas manager may provide one or more options for a start tile on the canvas based on one or more business transactions, human resource processes, or otherwise operations of the organization of automated workflows that the automated workflow tool previously created.

In response to receiving the selection of the start tile, at operation 304, the tile generator (e.g., 204) may present a number of selectable items for the user to configure the start tile. The number of selectable items may include multiple options (e.g., actions) for each of the following: a contact, a file, a folder, and a report. Further, the tile generator may present the selectable items on a user interface as a series of questions. In some embodiments, the tile generator may interface with one or more systems through an I/O device to populate the one or more selectable items on the user interface.

For example, when a user would like to engage an existing contact as a client, the user may select a start tile associated with a business purpose to engage a new client. In response to the canvas manager detecting the selection of the start tile, the tile generator can present a number of selectable items as a series of questions, as discussed below. A first question may include whether a contact, a file, a folder, or a record is about to be edited; a second question may include whether the edition is to create, change, or delete the selection to the first question; and a third question may include further details regarding the selection to the second question such as, to become a client, to check conflict of interest, or to become a vendor, etc.

At operation 306, the tile generator can monitor an action performed on the start tile. After the selectable items for the start tile are presented to the user, the user may perform an action to select the items to configure the start tile. In some embodiments, the tile generator can monitor such an action at operation 306, and determine whether the action can configure the start tile as a first step of the automated workflow at operation 307. In some embodiments, the tile generator may monitor which selections have been configured to each of the series of questions, and whether the configuration has been saved.

Continuing with the above example, the tile generator may detect that the user has configured the "contact" as the selection to the first question; the "change" as the selection to the second question; and "become a client" as the selection to the third question. The user may manually save the selections, or alternatively, the automated workflow tool may auto-save the selections once the user has configured each of the selections. Upon the tile generator detecting that the selections have been saved (e.g., the configuration of the start tile has been saved), the tile generator may determine that the selections can configure the start tile as the first step of the automated workflow. In response, the tile generator may determine whether the user selects to add an additional tile to the automated workflow in the configuration of the start tile (operation 309), and/or cause the workflow processor to execute the start tile (operation 320). In some embodiments, responsive to detecting that the configuration of the start tile has been saved, the tile generator may concurrently cause the workflow processor to execute the automated workflow while checking whether an additional tile is inquired to be added to the automated workflow.

If the tile generator determines that the configuration of the start tile is not indicative of adding an additional tile to the workflow at operation 309, the tile generator may continue monitoring the action performed on the start tile. If the configuration of the start tile is indicative of adding an additional tile to the workflow at operation 309, the tile generator may receive a selection of a second tile from multiple options for the second tile at operation 310. For example, the tile generator can execute or run a tile configuration detection technique, process or script to determine whether the configuration of the start tile contains any selections, input values, or instructions to add one or more additional tile. The options for the second tile may be provided based on one or more business transactions, human resource processes, or otherwise operations of the organization that the automated workflow tool previously handled. In some embodiments, such a record of the previous operations may be stored in the policy storage unit, and thus the tile generator may communicate with the policy storage unit to obtain the record so as to present the user the options of the second tile.

In response to receiving the selection of the second tile, at operation 312, the tile generator can present a number of selectable items for the second tile. The tile generator may use the number of selectable items to configure the second tile. In some embodiments, the tile generator may interface with one or more systems through an I/O device to populate the number of selectable items on a user interface. Continuing with the above example, the number of selectable items (e.g., actions) to configure the second tile may include, "create a folder," "send a document," "send an email," and "give folder access."

At operation 314, the tile generator can monitor an action performed on the second tile. After the selectable items for the second tile are presented to the user, the user may perform an action to select the above-discussed items (e.g., "create a folder," "send a document," "send an email," or "give folder access."). In response to detecting or identifying the selection of the above-discussed items, the tile generator can automatically specify one or more additional items to further configure the second tile. For example, in response to identifying that the user has selected "create a folder," the tile generator may automatically specify where the folder is to be created, a name of the folder, etc.

At operation 315, the tile generator can determine whether the action can configure the second tile as a next step of the automated workflow. In some embodiments, the tile generator may determine the detection of a configuration of the second tile based on which item for the second tile has been selected, and whether the selection has been saved. If the tile generator detects the configuration that can configure the second tile as the next step of the automated workflow at operation 315, the tile generator may provide a number of tiles, which can include at least a decision tile and two paths at operation 316. If the tile generator does not detect the configuration that can configure the second tile as the next step of the automated workflow 315, the tile generator may continue monitoring the action performed on the second tile (operation 314).

At operation 316, the tile generator can further identify that the configuration of the second tile further comprises a selection of a user interface element that instructs the automated workflow to obtain an input element for the second step. As such, the tile generator can generate at least one decision tile and one or more paths connected to the decision tile, each of which may represent a possible result determined from the decision tile. In the above example, the tile generator may detect that the user has selected "send a document" to configure the second tile, and further identify that the user has selected a user interface element to request the document to be signed. In response, the tile generator can create a decision tile used to determine whether the document is actually signed, and based on whether the signature is received, the tile generator create two paths derived from the decision tile. One path is directed to the situation where the signature is received, and the other path is directed to the situation where the signature to not received. In another example, the tile generator may identify that the user has selected a user interface element to configure the second tile that may derive more than two situations, e.g., more than yes and no situations as discussed above. As such, the tile generator can create a decision tile and a number of paths (e.g., 3 or more) to correspond to each of the situations.

At operation 318, the tile generator can determine whether the user interface element identified in the configuration of the second tile is obtained. If the tile generator determines that the user interface element has been obtained (the yes path in the above example), the tile generator can communicate with the workflow processor to execute the workflow; and if the tile generator determines that the user interface element has not been obtained (the no path in the above example), the tile generator can also communicate with the workflow processor to execute the workflow. Although either yes or no path can lead the workflow processor to execute the workflow, the automated workflow tool may automatically create one or more tiles on the canvas to build the workflow based on which of the paths the execution of workflow travels. For example, when the yes path is executed, the automated workflow tool may create no additional tile on the canvas. However, when the no path is executed, the automated workflow (e.g., the tile generator) may automatically create one or more tiles, connected to the no path, for the user to build the workflow.

As discussed above, an error checker (e.g., 206) of the automated workflow tool can perform one or more error detection operations to flag one or more errors in the automated workflow, and resolve the one or more identified errors prior to executing the automated workflow. The error checker can dynamically analyze each action and/or operations of the method 300 to identify an error according to one or more predefined policies/rules, and can present the identified error on a user interface to the user. According to the identification of the error, the error checker can resolve the error to cause the workflow to conform to the predefined polices/rules. In an embodiment, the error checker may resolve the error prior to the execution of any tile of the automated workflow. In another embodiment, the error checker may resolve the error simultaneously with the execution of one or more certain tiles of the automated workflow. In yet another embodiment, the error checker may resolve the error subsequently to the execution of one or more certain tiles of the automated workflow.

Referring to FIGS. 4A-E, various schematic diagrams of an exemplary GUI for automatically creating an automated workflow 400 are respectively shown. Each of FIGS. 4A-E may represent a respective one of a number of stages during the creation of the automated workflow, in accordance with some embodiments. The components and/or operations detailed herein in connection with FIGS. 1-3 (e.g., automated workflow tool 200) may be used to create the automated workflow 400.

Figure 4A:
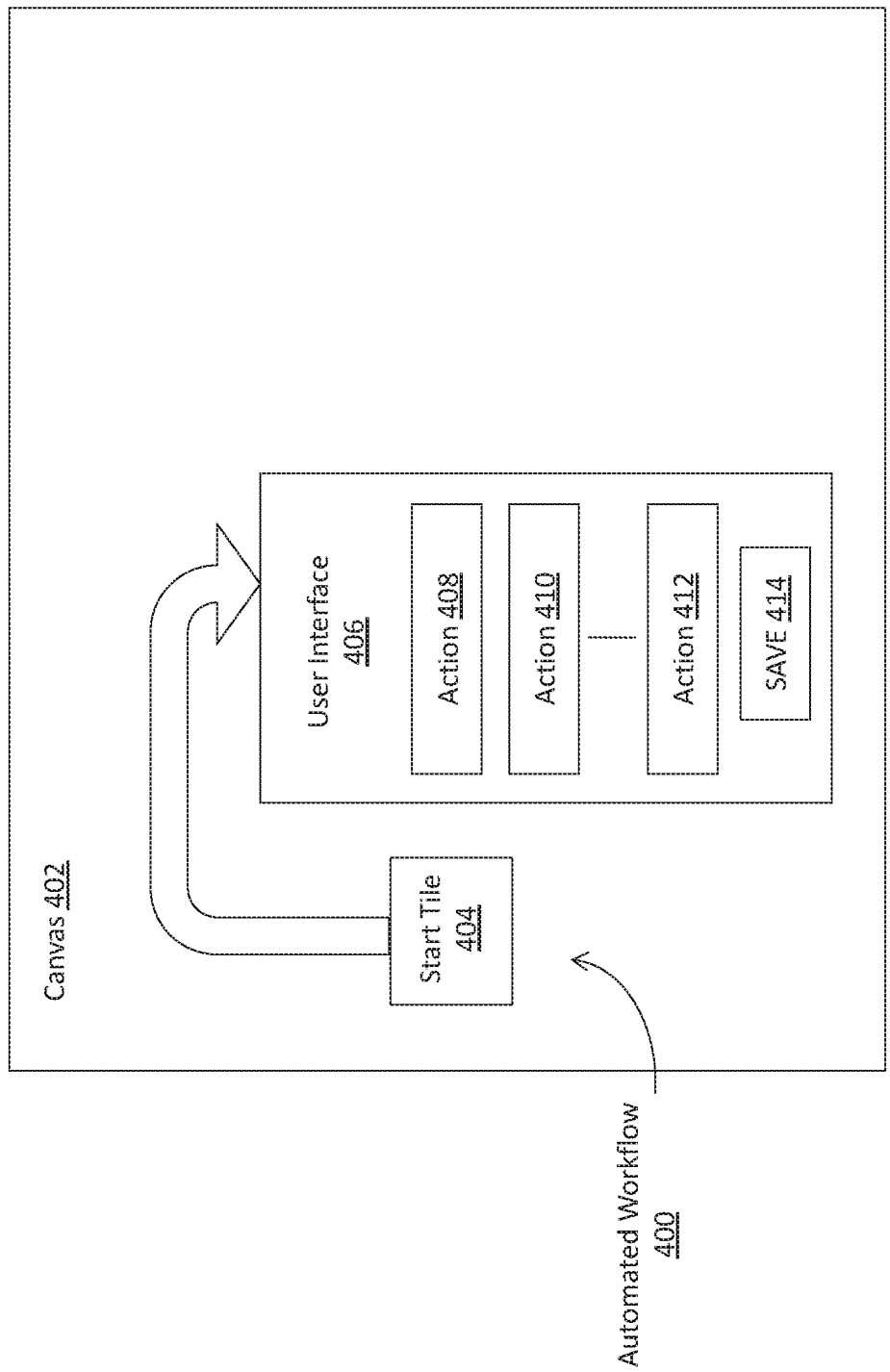

Referring first to FIG. 4A, as shown, the automated workflow 400 includes a start tile 404 on a canvas 402. As discussed above, the start tile 404 may be selected by a user from a number of options to suit a business purpose/operation that the user pursuits. Once the automated workflow tool 200 receives the selection of the start tile 404, the automated workflow tool 200 may present (e.g., populate) a user interface 406 for the user to configure the start tile 404.

In the illustrated example of FIG. 4A, the user interface 406 may include one or more selectable items, which are shown as "action 408," "action 410," and "action 412," for the user to configure the start tile 404. In some embodiments, the automated workflow tool may present a number of options for each of the actions 408-412. Further, in some embodiments, the automated workflow tool may dynamically configure (e.g., change) the options for each successive action. For example, in response to detecting the user selecting a first option for action 408, the automated workflow tool may change a set of options for action 410, which could have been provided to the user if a second option were selected for action 408, to another set of options. In some embodiments, after the user configures each of the actions, the user may use save 414 to save the configuration of the start tile 404.

In response to the automated workflow tool detecting that the configuration of the start tile 404, which also indicates the start tile as the initiation step to execute the automated workflow, is saved, the automated workflow tool creates a second tile 416 on the canvas 402, as shown in FIG. 4B. In some embodiments, the second tile 416 is connected to the start tile 404 to serve as the next step of the automated workflow 400.

Figure 4C:
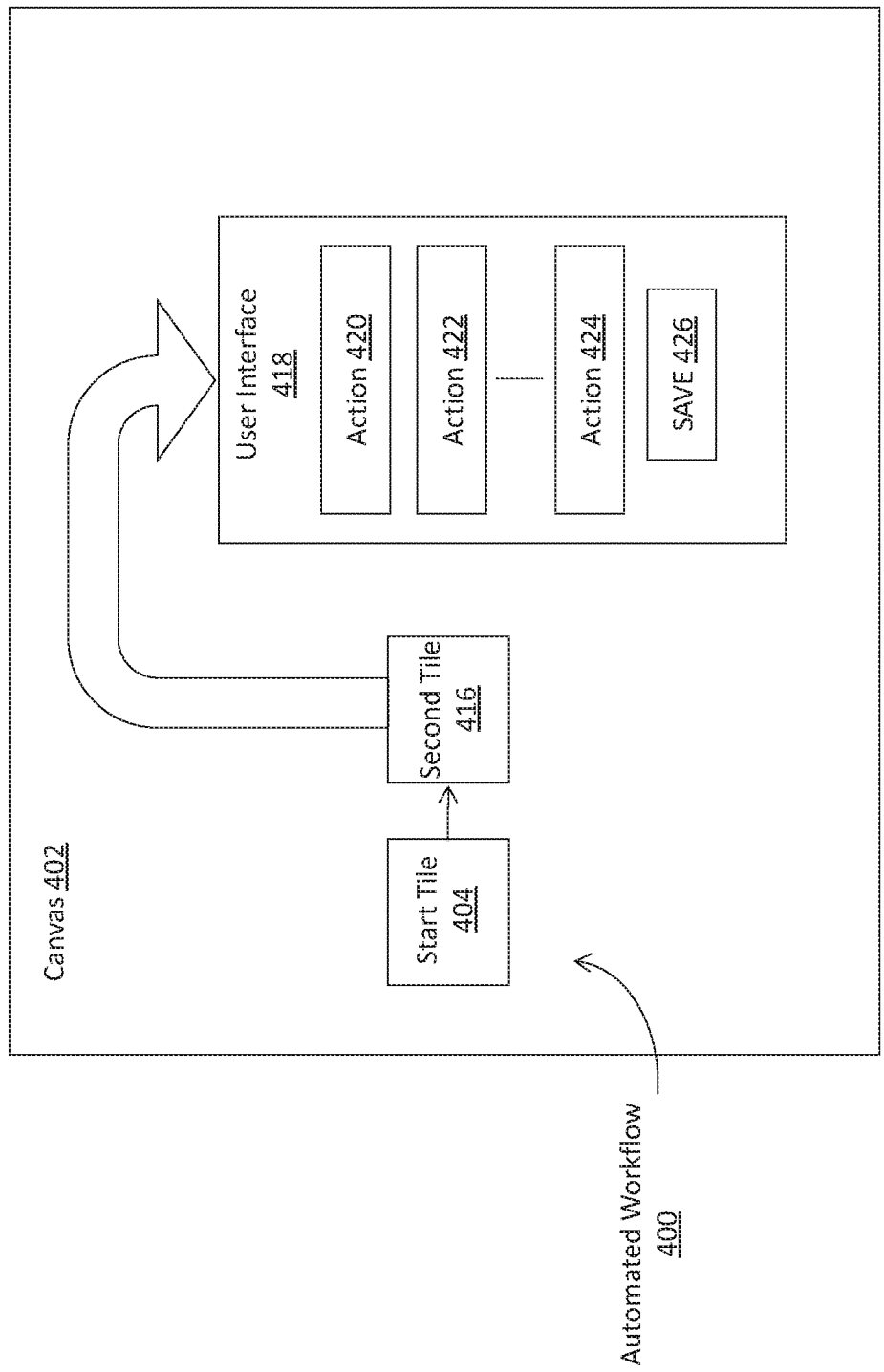

Concurrently with or subsequently to the creation of the second tile 416, the automated workflow tool 200 may present (e.g., populate) a user interface 418 for the user to configure the second tile 416, as shown in FIG. 4C. The user interface 418 may include one or more selectable items, which are shown as "action 420," "action 422," and "action 422," for the user to configure the second tile 416. In some embodiments, the automated workflow tool may present a number of options for each of the actions 420-424. Further, in some embodiments, the automated workflow tool may dynamically configure (e.g., change) the options for each successive action. After the user configures each of the actions, the user may use save 426 to save the configuration of the second tile 416.

Figure 4D:
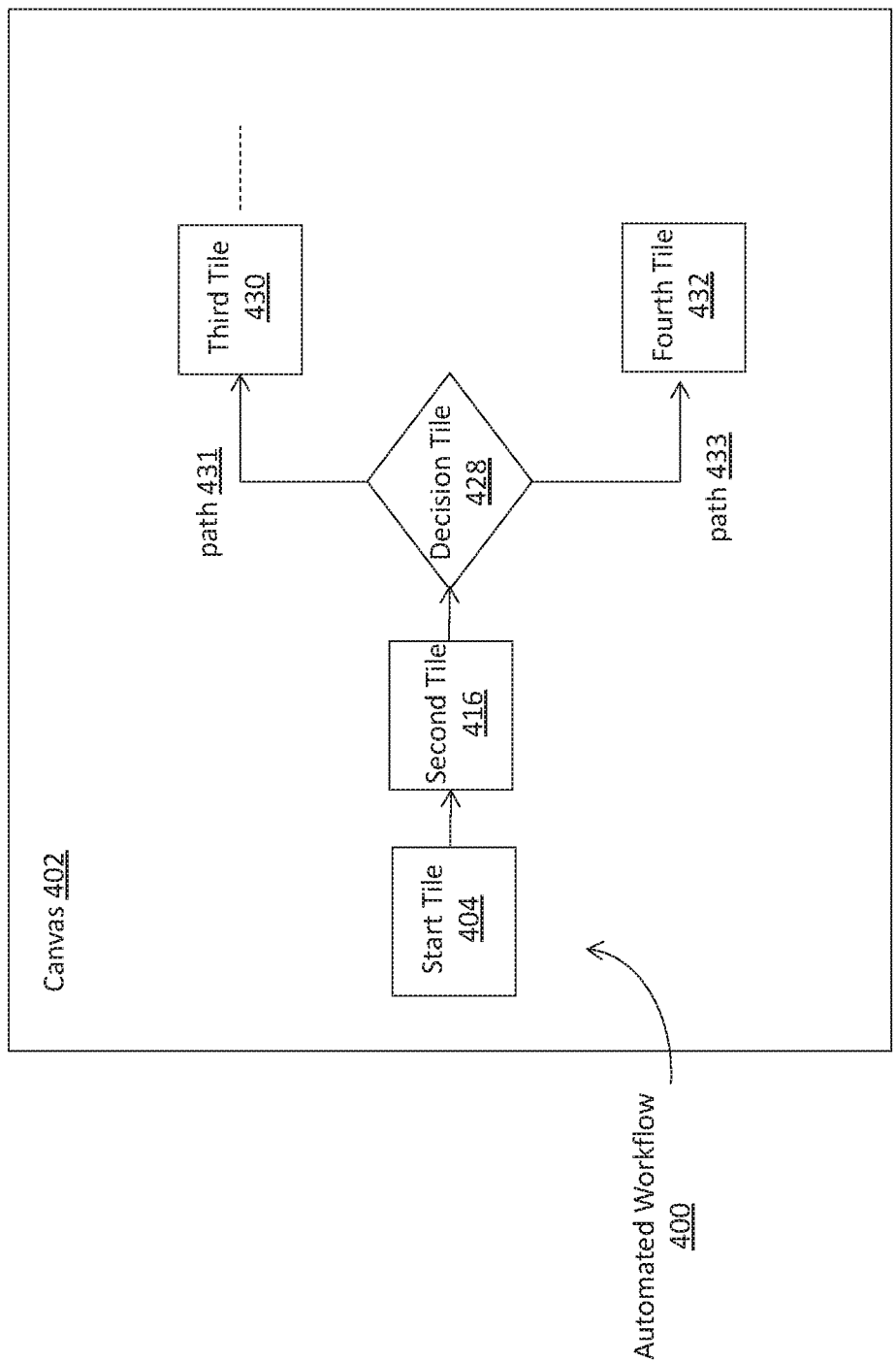

In response to the automated workflow tool detecting that the configuration of the second tile 416, which may be indicative of instructing the automated workflow tool to obtain a user interface element for the second tile 416, is saved, the automated workflow tool creates a decision tile 428, a third tile 430, and a fourth tile 432, as shown in FIG. 4D. The decision tile 428 is connected to the second tile 416, and further extends into the tiles 430 and 432 through two respective paths 431 and 433. The paths 431 and 433 may correspond to respective different decisions made in the decision tile 428. For example, at decision tile 428, the automated workflow tool can determine whether the user interface element has been obtained. If yes, the automated workflow tool may execute the automated workflow 400 along the path 431; and if not, the automated workflow tool may execute the automated workflow 400 along the path 433.

Figure 4E:
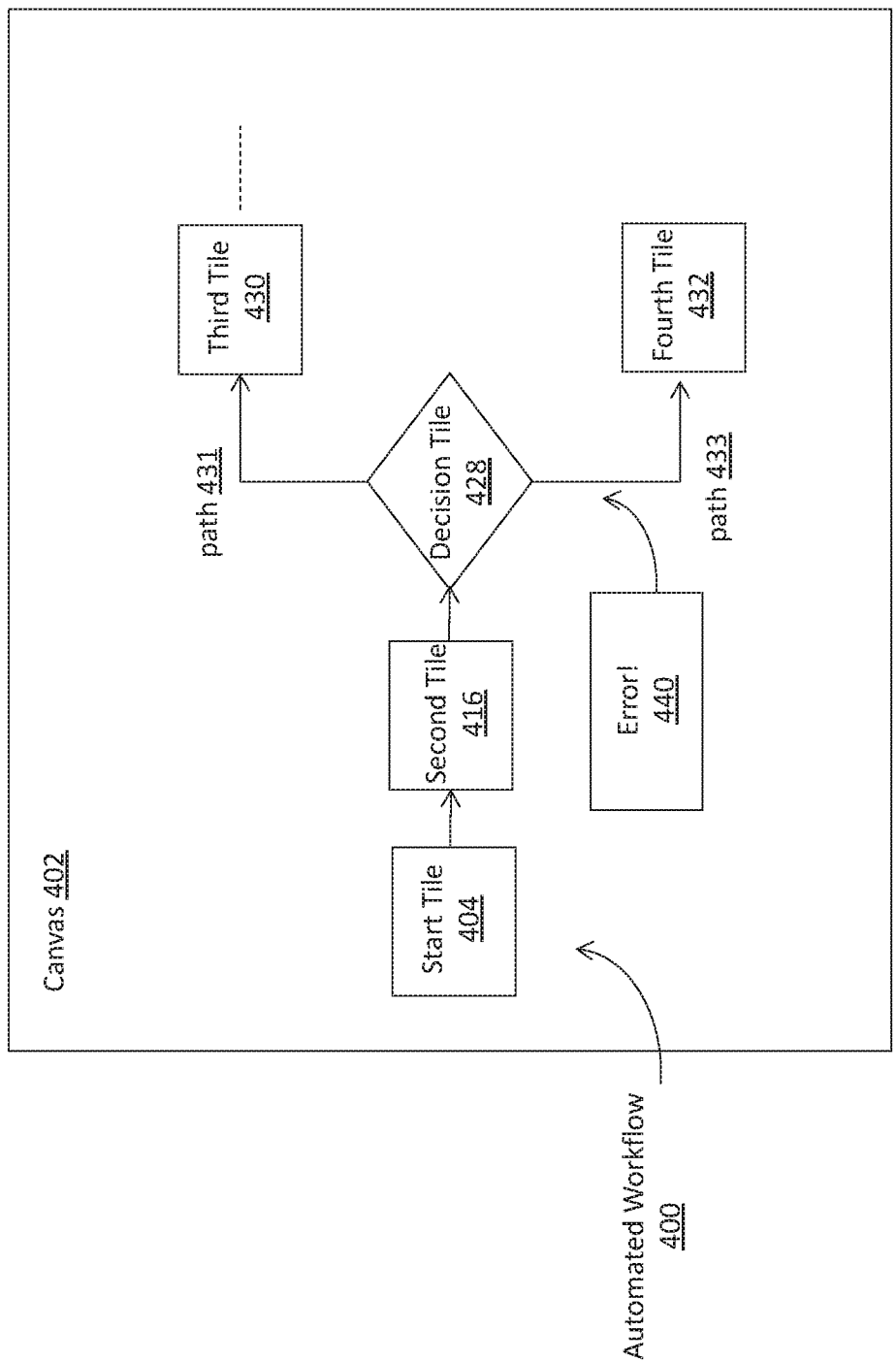

In some embodiments, the automated workflow tool can dynamically perform one or more error detection operations to flag an error in the automated workflow 400. As shown in FIG. 4E, once the automated workflow tool determines that no user interface element, configured in the second tile 416, has been obtained at the decision tile 428, prior to the automated workflow tool executing the workflow, the automated workflow tool may populate an error message 440 to flag what and/or where the error is along the workflow 400. In some embodiments, the automated workflow tool may automatically resolve the error when concurrently populating the error message, or wait for the user to provide further input (e.g., manually resolve the error).

Thus, the systems and methods of the automatic workflow tool depicted and described via FIGS. 2-4E provide a technical solution that can efficiently create a complex workflow comprising policies, logic statements, rules, or conditions while reducing or eliminating technical problems including errors or bugs from the workflow prior to execution, thereby preventing or minimizing execution failure, erroneous traversing of workflow paths, while reducing processor, memory, or bandwidth utilization.

For example, when a computing device or system executes workflows that are inefficient or contain errors or bugs, the computing device can malfunction or traverse incorrect paths in the workflow, thereby resulting in excessive or wasted computer resource utilization (e.g., processor utilization, memory utilization, or bandwidth utilization). The present technical solution can provide technical improvements while solving technical challenges that can include, for example, improved user interfaces, reduce data file processing related to actions, and reliable coding of scripts. For example, the automated workflow tool of the present technical solution can address these technical problems by receiving a selection of a start tile previously placed by the automated workflow tool on a canvas of the automated workflow tool upon a request to create a workflow, opening the start tile to present a first user interface of selectable items to configure an action to detect that initiates execution of the start tile as the first step in the automated workflow; determining, responsive to saving a configuration of the start tile including the action, that the configuration of the start tile comprises a selection of a user interface element that instructs the automated workflow tool to add another step; creating, responsive to determining that the configuration of the start tile comprises the selection of the user interface element to instruct the automated workflow tool to add another step, a second tile connected to the start tile on the canvas of the automated workflow, wherein the second tile opens, upon selection, to present a second user interface of selectable items to configure the second tile as a next step in the automated workflow to execute based on one or more selections in the configuration of the start tile, and executing the automated workflow configured with at least the start tile and the second tile responsive to the automated workflow tool detecting the action configured in the start tile. The automated workflow tool, by determining, responsive to saving a configuration of the start tile including the action, that the configuration of the start tile comprises a selection of a user interface element that instructs the automated workflow tool to add another step; creating, responsive to determining that the configuration of the start tile comprises the selection of the user interface element to instruct the automated workflow tool to add another step, a second tile connected to the start tile on the canvas of the automated workflow, wherein the second tile opens, upon selection, to present a second user interface of selectable items to configure the second tile as a next step in the automated workflow to execute based on one or more selections in the configuration of the start tile can reduce inefficiencies or, errors or bugs that can result in traversing incorrect paths in the workflow, thereby reducing or eliminating excessive or wasted computer resource utilization (e.g., processor utilization, memory utilization, or bandwidth utilization).

For example, the present technical solution can convert processes (e.g., onboarding a client) into one or more automatically created workflows. The present technical solution can simultaneously build an automated version of the workflow based on one or more inputs provided via a user interface. The tool can establish processing logic at each step in the workflow and proactively provide an element and/or logic for the next step. Thus, the automated workflow can efficiently streamline a process while reducing execution failure or errors.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for automatically creating an executable workflow, the method comprising:
   (a) receiving, by an automated workflow tool, a selection of a start tile previously placed by the automated workflow tool on a canvas of the automated workflow tool upon a request to create a workflow;
   (b) receiving, by an interface of the automated workflow tool from one or more systems different from the automated workflow tool, a list of selectable items managed by one or more applications executable by the one or more systems to open, by the automated workflow tool responsive to receiving the selection, the start tile to present a first user interface of the selectable items to configure an action to detect that initiates execution of the start tile as the first step in the automated workflow;
   (c) determining, by the automated workflow tool responsive to detecting a configuration of the start tile including the action selected via a user interface element to perform on an item managed by an application of the one or more applications different from the automated workflow tool is complete based on applying a tile completion detection process with a template for the start tile to the configuration of the start tile and saving the configuration, to add another step to the automated workflow;
   (d) creating, by the automated workflow tool responsive to determining that the configuration of the start tile comprises the selection of the user interface element to cause the automated workflow tool to add another step, a second tile connected to the start tile on the canvas of the automated workflow, wherein the second tile opens, upon selection, to present a second user interface of selectable items to configure the second tile as a next step in the automated workflow to execute based on one or more selections in the configuration of the start tile; and
   (e) executing, by the automated workflow tool, the automated workflow configured with at least the start tile and the second tile responsive to the automated workflow tool detecting the action configured in the start tile.

2. The method of claim 1, wherein (d) further comprises:
   i. identifying, by the automated workflow tool responsive to saving a configuration of the second tile, that the configuration of the second tile comprises a second selection of a second user interface element that instructs the automated workflow to obtain an input element for a second step;
   ii. creating, by the automated workflow tool responsive to identifying the instruction to obtain an input element for the second step, a plurality of tiles to create two paths of execution of the automated workflow, the plurality of tiles comprising a decision tile connected to the second tile configured to detect receipt of the input element for the second step and select, based on the detection, one of the two paths of the automated workflow for execution.

3. The method of claim 1, wherein the configuration of the start tile comprises selection via the first user interface of the item on which the automated workflow performs the action, the item comprising one of the following: a contact, a file, a folder or a report.

4. The method of claim 3, wherein the action comprises one of creating, changing or deleting the item.

5. The method of claim 4, wherein the automated workflow tool interfaces with one or more systems to detect the action of the start tile.

6. The method of claim 5, wherein the one or more systems comprises the application for managing one of the contact, the file, the folder or the report.

7. The method of claim 1, wherein the automated workflow tool interfaces with one or more systems to populate selection of the first user interface or the second user interface.

8. The method of claim 1, wherein configuration of the second tile comprises selection via the second user interface of a second action to be performed upon completion of execution of the start tile, the second user interface configured to provide one or more selections based at least on the item of the action selected in the start tile, and the automated workflow tool interfaces with one or more systems to execute the second action of the second tile.

9. The method of claim 1, further comprising providing access, by the automated workflow tool, to the configuration of the automated workflow to a plurality of users and providing a third user interface for any one or more of the plurality of users to add comments to the configuration of the automated workflow.

10. The method of claim 1, wherein (d) further comprises performing error detection to flag one or more errors in the automated workflow, and resolving the one or more errors prior to executing the automated workflow.

11. A system to automatically create an executable workflow, comprising:
   an automated workflow tool of a device comprising one or more processors and memory configured to:
   receive a selection of a start tile previously placed by the automated workflow tool on a canvas of the automated workflow tool upon a request to create a workflow;
   receive, via an interface from one or more systems different from the automated workflow tool, a list of selectable items managed by one or more applications executable by the one or more systems;
   open, responsive to receiving the selection, the start tile to present a first user interface of the selectable items to configure an action to detect that initiates execution of the start tile as the first step in the automated workflow;
   determine, responsive to detecting a configuration of the start tile including the action selected via a user interface element to perform on an item managed by an application of the one or more applications different from the automated workflow tool is complete based on application of a tile completion detection process with a template for the start tile to the configuration of the start tile and saving the configuration, to add another step to the automated workflow;
   create, responsive to determining that the configuration of the start tile comprises the selection of the user interface element to cause the automated workflow tool to add another step, a second tile connected to the start tile on the canvas of the automated workflow, wherein the second tile opens, upon selection, to present a second user interface of selectable items to configure the second tile as a next step in the automated workflow to execute based on one or more selections in the configuration of the start tile; and execute the automated workflow configured with at least the start tile and the second tile responsive to the automated workflow tool detecting the action configured in the start tile.

12. The system of claim 11, wherein the automated workflow tool is further configured to:
identify, responsive to saving a configuration of the second tile, that the configuration of the second tile comprises a second selection of a second user interface element that instructs the automated workflow to obtain an input element for a second step;
create, responsive to identifying the instruction to obtain an input element for the second step, a plurality of tiles to create two paths of execution of the automated workflow, the plurality of tiles comprising a decision tile connected to the second tile configured to detect receipt of the input element for the second step and select, based on the detection, one of the two paths of the automated workflow for execution.

13. The system of claim 11, wherein configuration of the start tile comprises selection via the first user interface of the item on which the automated workflow performs the action, the item comprising one of the following: a contact, a file, a folder or a report.

14. The system of claim 13, wherein the action comprises one of creating, changing or deleting the item.

15. The system of claim 14, wherein the automated work flow tool is configured to interface with one or more systems to detect the action of the start tile.

16. The system of claim 15, wherein the one or more systems comprises the application configured to manage one of the contact, the file, the folder or the report.

17. The system of claim 11, wherein the automated workflow tool is configured to interface with one or more systems to populate selection of the first user interface or the second user interface.

18. The system of claim 11, wherein configuration of the second tile comprises selection via the second user interface of a second action to be performed upon completion of execution of the start tile, the second user interface configured to provide one or more selections based at least on the item of the action selected in the start tile, and the automated work flow tool is configured to interface with one or more systems to execute the second action of the second tile.

19. The system of claim 11, wherein the automated workflow tool is further configured to provide access to the configuration of the automated workflow to a plurality of users and provide a third user interface for any one or more of the plurality of users to add comments to the configuration of the automated workflow.

20. The system of claim 11, wherein the automated workflow tool is further configured to perform error detection to flag one or more errors in the automated workflow, and resolve the one or more errors prior to execution of the automated workflow.

* * * * *